US010366541B2

United States Patent
Herman et al.

(10) Patent No.: US 10,366,541 B2
(45) Date of Patent: Jul. 30, 2019

(54) VEHICLE BACKUP SAFETY MAPPING

(71) Applicant: Ford Global Technologies, LLC, Dearborn, MI (US)

(72) Inventors: David M. Herman, Southfield, MI (US); David A. Herman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 15/656,787

(22) Filed: Jul. 21, 2017

(65) Prior Publication Data

US 2019/0026947 A1    Jan. 24, 2019

(51) Int. Cl.
| | | |
|---|---|---|
| *G06T 19/00* | (2011.01) | |
| *G06K 9/00* | (2006.01) | |
| *H04N 7/18* | (2006.01) | |
| *H04N 5/232* | (2006.01) | |
| *G06K 9/78* | (2006.01) | |
| *B60R 1/00* | (2006.01) | |
| *B60R 1/12* | (2006.01) | |
| *G06K 9/62* | (2006.01) | |

(52) U.S. Cl.
CPC .............. *G06T 19/006* (2013.01); *B60R 1/00* (2013.01); *B60R 1/12* (2013.01); *G06K 9/00805* (2013.01); *G06K 9/6267* (2013.01); *G06K 9/78* (2013.01); *H04N 5/23293* (2013.01); *H04N 7/181* (2013.01); *B60K 2350/106* (2013.01); *B60K 2350/1088* (2013.01); *B60K 2350/2013* (2013.01); *B60K 2350/2017* (2013.01); *B60K 2350/2065* (2013.01); *B60K 2350/352* (2013.01); *B60R 2001/1253* (2013.01); *B60R 2300/105* (2013.01); *B60R 2300/301* (2013.01); *B60R 2300/308* (2013.01); *B60R 2300/806* (2013.01); *B60R 2300/8033* (2013.01); *B60R 2300/8093* (2013.01)

(58) Field of Classification Search
None
See application file for complete search history.

(56) References Cited

U.S. PATENT DOCUMENTS

| | | |
|---|---|---|
| 7,930,078 B2 | 4/2011 | Sugiura et al. |
| 8,659,408 B2 | 2/2014 | Taylor et al. |
| 9,050,931 B2 | 6/2015 | Yamamoto et al. |

(Continued)

FOREIGN PATENT DOCUMENTS

| | | |
|---|---|---|
| CN | 105946853 A | 9/1916 |
| KR | 20150051735 A | 5/2015 |
| WO | WO 2013110479 A1 | 8/2013 |

*Primary Examiner* — Nurun N Flora
(74) *Attorney, Agent, or Firm* — Frank Lollo; Neal, Gerber & Eisenberg LLP; James P. Muraff (57) ABSTRACT

Method and apparatus are disclosed for vehicle backup safety mapping. An example vehicle includes a display, a rear-view camera, and a processor. The processor generates a three-dimensional model of space behind the vehicle based on images from the rear-view camera The processor also generates an overlay based on the three-dimensional model. The overlay includes representation of objects not in the field of view of the rear-view camera. Additionally, the processor displays, on the display, the images from the rear-view camera and the overlay.

14 Claims, 6 Drawing Sheets

(56) References Cited

U.S. PATENT DOCUMENTS

| | | | |
|---|---|---|---|
| 2012/0265416 A1* | 10/2012 | Lu | B60R 1/00 |
| | | | 701/70 |
| 2015/0109444 A1 | 4/2015 | Zhang et al. | |
| 2017/0220876 A1* | 8/2017 | Gao | G06K 9/00805 |
| 2017/0247030 A1* | 8/2017 | Rinaldo | B60W 10/20 |

* cited by examiner

VEHICLE BACKUP SAFETY MAPPING

TECHNICAL FIELD

The present disclosure generally relates to vehicle rear-view cameras and, more specifically, vehicle backup safety mapping.

BACKGROUND

When backing up and using a rear backup camera, a driver can become disoriented to the position of the car relative to other static objects (e.g. parked vehicles, support columns, barriers, etc.), especially in tight parking spots requiring repeat turns and reversing. The rear view camera has a limited field of view (FOV) that is limited by the physical position of the vehicle. As a result, other object, such as other parked vehicle, may not always be in view. For example, the fish eye lens will have a large FOV, typically 90 to 170 degrees, to present the drive with vision of vehicles to the edges of the car. However, even with a wide FOV, the position and geometry of the vehicle and position of the camera will create natural blind spots primarily located at the rear corner bumpers of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for vehicle backup safety mapping. An example vehicle includes a display, a rear-view camera, and a processor. The processor generates a three-dimensional model of space behind the vehicle based on images from the rear-view camera. The processor also generates an overlay based on the three-dimensional model. The overlay includes representation of objects not in the field of view of the rear-view camera. Additionally, the processor displays, on the display, the images from the rear-view camera and the overlay.

An example method to assist a reverse moving vehicle includes generating a three-dimensional model of space behind and/or to the sides of the vehicle based on images from a rear-view camera and generating an overlay based on the three-dimensional model. The overlay includes a cross-section of the model representing edges of surfaces within the model. The method also includes displaying, on a center console display, the images from the rear-view camera and the overlay. Additionally, the method includes providing an alert via an infotainment system when (i) one of the surfaces in the model is identified as belonging to a hazard or (ii) when the vehicle comes within a threshold distance to one of the surfaces according to the model.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As described below, a vehicle backup safety mapping system uses input from (a) a rear-view camera (b) other sensors (e.g., ultrasonic sensors, RADAR, LiDAR, etc.) and/or cameras (e.g., side view mirror cameras, etc.) and (c) information (e.g., from electronic control units (ECUs)) regarding wheel orientation and rotation to generate a representation of the three-dimensional space behind the vehicle. The motion of the vehicle is tracks through the three-dimensional space to provide to a driver the representation of the space behind the vehicle that is not within the current view of the rear-view camera. When the gear shifter is positioned into reverse, the system analyzes images captured by the rear-view camera and data captured by the other sensors to determine the three dimensional structure of the surroundings of the vehicle with respect to the vehicle. As the vehicle moves in reverse, the system continues to update that three dimensional structure and tracks the vehicle's movement through the space. A representation of the three dimensional space is overlaid onto the image captured by the rear-view camera displayed on a display of the infotainment head unit. The overlay includes representations in the three dimensional space that are not currently in the view of the rear-view camera. These representations may include an overhead, isometric, or another perspective of the three dimensional space. In some examples, the representations include coloring to signify different properties of certain portions of the three dimensional space. Additionally, the system provides proximity alerts to the driver when the vehicle approaches obstacle(s) that are not in the current view of the rear-view camera or other sensors via tracking said objects in space with movement of the vehicle.

Figure 1:
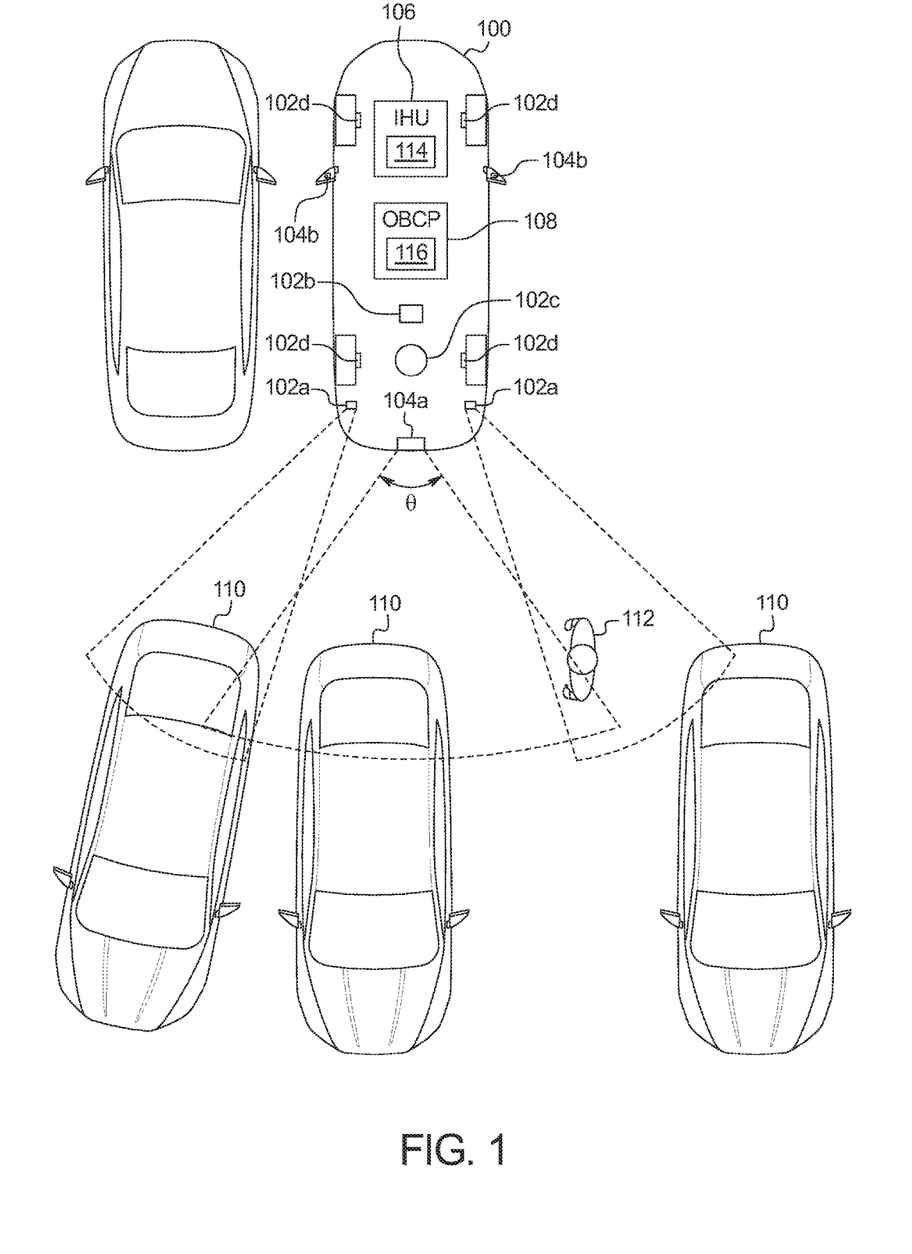
FIG. 1 illustrates a vehicle operating in accordance with the teachings of the disclosure.

FIG. 1 illustrates a vehicle 100 operating in accordance with the teachings of the disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous or semi-autonomous (e.g., some routine motive functions controlled by the vehicle 100). In the illustrated example the vehicle 100 includes sensors 102a-102e, cameras 104a and 104b, an infotainment head unit 106, and an on-board computing platform 108.

Sensors may be arranged in and around the vehicle 100 in any suitable fashion. The sensors may be mounted to measure properties around the exterior of the vehicle 100. Additionally, some sensors may be mounted inside the cabin of the vehicle 100 or in the body of the vehicle 100 (such as, the engine compartment, the wheel wells, etc.) to measure properties in the interior of the vehicle 100. For example, such sensors may include accelerometers, odometers, tachometers, pitch and yaw sensors, microphones, tire pressure sensors, and biometric sensors, etc. In the illustrated example, the sensors 102a-102e include ultrasonic sensors 102a, RADAR 102b, LiDAR 102c, wheel speed sensors 102d, and/or wheel angle sensors 102e.

The ultrasonic sensors 102a, RADAR 102b, and/or LiDAR 102c are used to detect objects (e.g., other vehicles 110, pillars, barriers, pedestrians 112, etc.) in the vicinity of the vehicle 100. The data captured by the ultrasonic sensors 102a, RADAR 102b, and/or LiDAR 102c is used to generate a three dimensional map of the area around the vehicle 100. The ultrasonic sensors 102a, RADAR 102b, and/or LiDAR 102c are positioned on the vehicle 100 to detect the objects in the space around the vehicle 100 not captured by the rear-view camera 104a. The wheel speed sensors 102d and/or wheel angle sensors 102e are used to determine the location of the vehicle 100 within the three dimensional map and determine the corresponding portion of the three dimensional map that is viewable from the rear-view camera 104a.

The cameras 104a and 104b capture images of the area around the vehicle 100. The images are used to detect and/or identify objects around the vehicle 100. The rear-view camera 104a is mounted on the rear of the vehicle 100. The area behind the vehicle 100 that the cameras 104a can capture is defined by a field of vision (defined by the viewable angle θ), distortion coefficients, focal lengths, and optical centers. While the transmission of the vehicle 100 is in reverse, the images captured by the rear-view camera 104a are displayed on the infotainment head unit 106. The side-mirror cameras 104b are positioned to capture images to detect objects that are not captured by the rear-view camera 104a.

The infotainment head unit 106 an interface between the vehicle 100 and a user. The infotainment head unit 106 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, and/or speakers. The infotainment head unit 106 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). The infotainment head unit displays the infotainment system ZZZ on, for example, a center console display 114. The center console display is a display (e.g., a liquid crystal display ("LCD"), an organic light emitting diode ("OLED") display, a flat panel display, a solid state display, etc.) that, in some examples, includes a touchscreen. When the transmission of the vehicle 100 is in reverse, the center console display 114 displays an interface (e.g., the interface 200 of FIG. 2 or the interface 300 of FIG. 3 below) that provides the view of the rear-view camera 104a and an overlay of a representation of the three dimensional space behind the vehicle 100.

The on-board computing platform 108 includes processor(s) (e.g., the processor 406 of FIG. 4 below), memory (e.g., the memory 408 of FIG. 4 below) and/or circuitry to communicate with the sensors 102a-102d and the infotainment head unit 106. In the illustrated example, the on-board computing platform 108 includes a data fuser 116. The data fuser 116 receives the data from the sensors 102a-102d and the cameras 104a and 104b to (a) generate a three dimensional representation of the space behind the vehicle 100, (b) track the location of the vehicle 100 within the three dimensional representation, and (c) generate an overlay to impose on the image from the rear-view camera 104a which provides information about obstacles that are not visible in the images captured by the rear-view camera 104a.

The data fuser 116 monitors for when the transmission of the vehicle 100 is placed into reverses to start gathering information from the sensors 102a-102d and/or the cameras 104a and 104b. With the cameras 104a and 104b, the data fuser 116 performs image classification or classification via the 3D information to recognize and/or categorized objects (e.g., such as the other vehicles 110, pillars, barriers, the pedestrians 112, etc.). In some examples, the data fuser 116 also uses the images from the cameras 104a and 104b to determine distances between the objects and the vehicle 100. The data fuser 116 creates the three dimensional map of the area behind the vehicle 100 based on measurements from the sensor 102a-102c. The data fuser uses the measurements from the wheel speed sensors 102d and the wheel angle sensors 102e to (a) track the location of the vehicle 100 in the area, (b) track the location of the FOV of the rear-view camera 104a, and (c) determine the physical position and angle of the rear-view camera 104a relative to the physical geometry of the vehicle 100.

Figure 2:
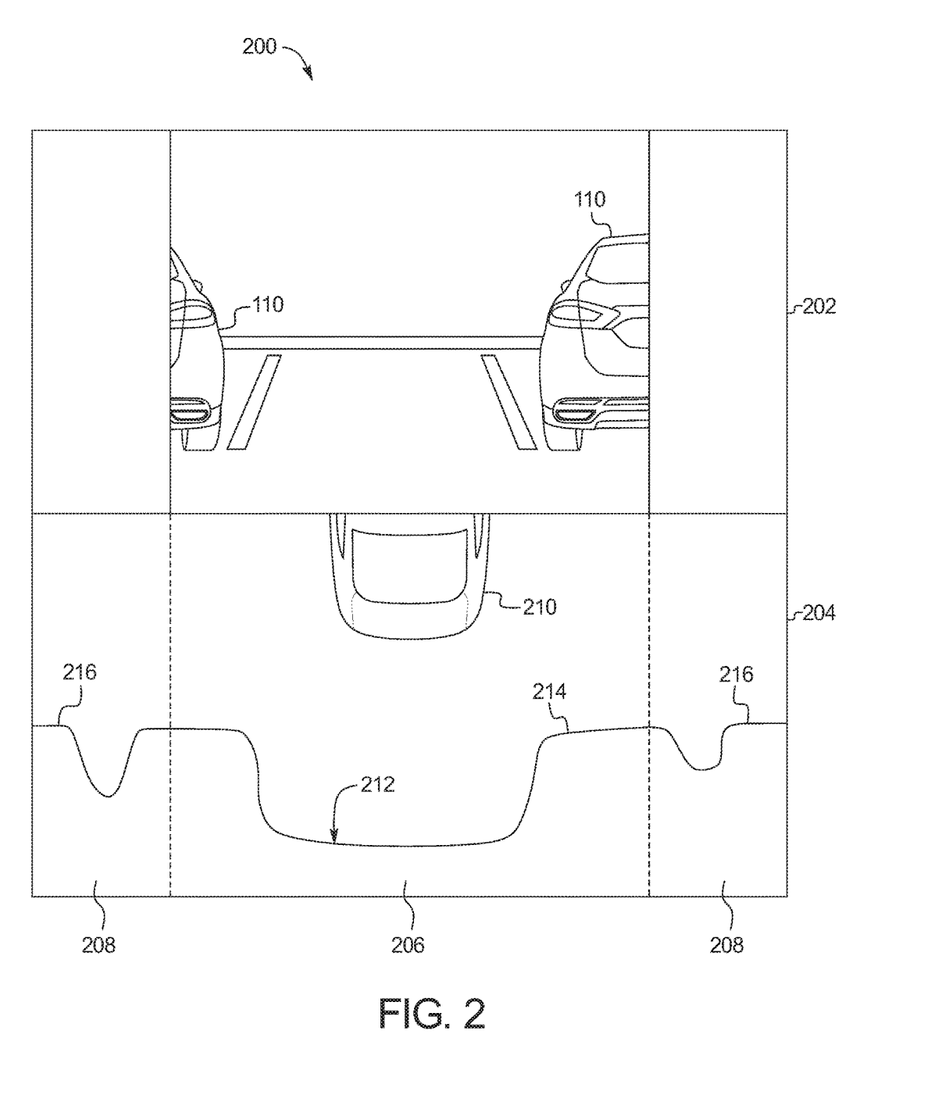
FIGS. 2 and 3 illustrate displays on an infotainment head unit of the vehicle of FIG. 1.

The results of the image classification and the three dimensional map are combined to generate a point cloud of the area that represents the surfaces detected by the sensors 102a-102d and the cameras 104a and 104b. The point cloud is a representation of the edges and surfaces detected in the three-dimensional space behind the vehicle 100. In some examples, the point cloud also includes the three-dimensional space to the sides of the vehicle 100 (e.g., as observed by the side-mirror cameras 104b and/or sensors 102a-102c, etc.). The images captured by the rear-view camera 104a are displayed on the center console display 114. As shown in FIG. 2 below, a two dimensional cross-section of the point cloud (e.g., the representation 212) is overlaid onto the image displayed on the center console display 114 corresponding to (i) the FOV of the rear-view camera 104a and (ii) a portion of the cross-section of the point cloud that is not within, but contiguous with, the FOV of the rear-view camera 104a (e.g., as discussed in connection with FIG. 2 below). The data fuser 116 periodically (e.g., every 1 second, every 5 seconds, every 10 seconds, every 15 seconds, etc.) repeats this process to update the point cloud and the display based on movement of the vehicle 100 and movement of detected objects. In some example, the frequency at which the data fuser 116 updates the point cloud and the display is based on the speed of the vehicle 100 and, whether a pedestrian 112 is detected, and/or whether two consecutive scans detects that an object is moving. For example, if a pedestrian 112 is detected, the data fuser 116 may increase the frequency at which it updates the point cloud.

The data fuser 116 provides an alert (e.g., an audiovisual alert, etc.), via the infotainment head unit 106, when the feature detection identifies the pedestrian 112 or other hazard (e.g., an object that is low to the ground, such as a bicycle, an animal, etc.). The data fuser 116 provides an alert, via the via the infotainment head unit 106, when a distance between the vehicle 100 and the cross-section of the point cloud is less that a threshold distance (e.g., six inches, one foot, etc.). In some examples, the data fuser 116 provides an alert, via the via the infotainment head unit 106, when a surface defined by the point cloud is detected to be in motion. For example, the data fuser 116 may designate one color for a portion of the cross-section of the point cloud that is stationary and another color for the portion of the cross-section of the point cloud that is detected to be in motion. Additionally, in some examples, the data fuser 116 provides an alert, via the infotainment head unit 106, when a portion of the area in behind that vehicle 100 cannot be observed by the cameras 104a and 104b and the sensors 102a-102c. For example, the vehicle 100 may be parked next to a pillar that obscures behind the vehicle 100 from the sensors 102a-102c and the cameras 104a and 104b. In some examples, the data fuser 116 continues to monitor the area behind the vehicle 100 and provide alerts until the vehicle 100 is moving forward at a speed greater than a forward speed threshold (e.g., 5 miles per hour, 10 miles per hour, etc.)

In some examples, the data fuser 116 continually classifies objects based on the cameras 104a and 104b while the vehicle 100 is moving forward. In some such examples, the data fuser 116 stores the locations and classifications of the objects classifies as stationary for a threshold distance (e.g., 10 feet, 20 feet, etc.). In such a manner, when the vehicle 100 parks, the stationary objects will already be identified and classified for when the vehicle 100 is next restarted.

FIG. 2 illustrates an interface 200 displayed on the infotainment head unit 106 of the vehicle 100 of FIG. 1. In the illustrated example, the interface 200 is dived into a camera view 202 and a projected overhead view 204. The camera view 202 displays the view of the rear-view camera 104a. The projected overhead view 204 includes visible area 206 and non-visible areas 208. The projected overhead view 204 also includes a representation 210 of the vehicle 100 and a representation 212 of the cross-section of the point cloud. The representation 212 of the cross-section of the point cloud is indicative of where the sensors 102a-102c and/or the cameras 104a and 104b have determined boundaries of occupied areas behind the vehicle 100. In the illustrated example, a portion 214 of the representation 212 of the cross-section of the point cloud is displayed in the visible area 206 that corresponds to the image displayed in the camera view 202. Other portions 216 of the representation 212 of the cross-section of the point cloud are displayed in the non-visible areas 208 corresponding to boundaries of occupied areas behind the vehicle 100 of which are not visible because of the FOV of the rear-view camera 104a. As the vehicle 100 moves and the FOV of the rear-view camera 104a changes, the displayed representation 212 of the cross-section of the point cloud changes based on the point cloud and the location of the vehicle 100 tracked with reference to the point cloud.

Figure 3:
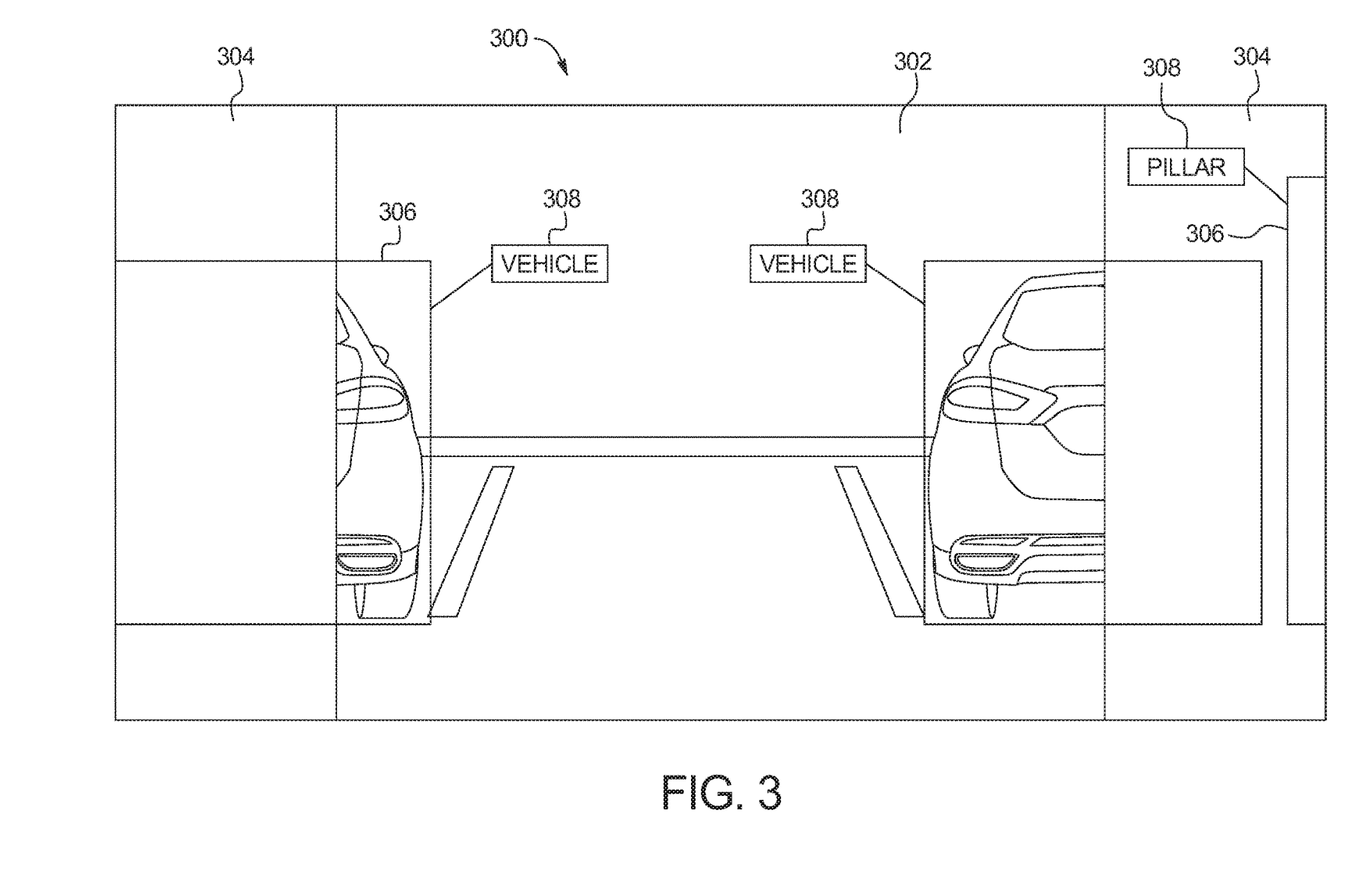

FIG. 3 illustrates an interface 300 displayed on the infotainment head unit 106 of the vehicle 100 of FIG. 1. In the illustrated example, the interface 300 is divided into a visible area 302 and non-visible areas 304. Images captured by rear-view camera 104a are displayed in the visible area 302. The non-visible areas 304 are representative of areas that are contiguous with the visible area 302, but are not visible because of the FOV of the rear-view camera 104a. In the illustrated example, the objects identified and/or classified based on the images from the camera 104a and 104b and/or the sensors 102a-102c are encircled by outlines 306 that represent the boundaries of the objects. When the object extends into the non-visible area 304, the corresponding outline also extends into the non-visible area 304. In such a manner, the interface 300 includes information about the location of objects that cannot be fully seen in the images captured by the rear-view camera 104a. In some examples, when the objects are identified, the interface 300 includes labels 308 that provide identifying information of the object to the occupant(s) of the vehicle 100.

Figure 4:
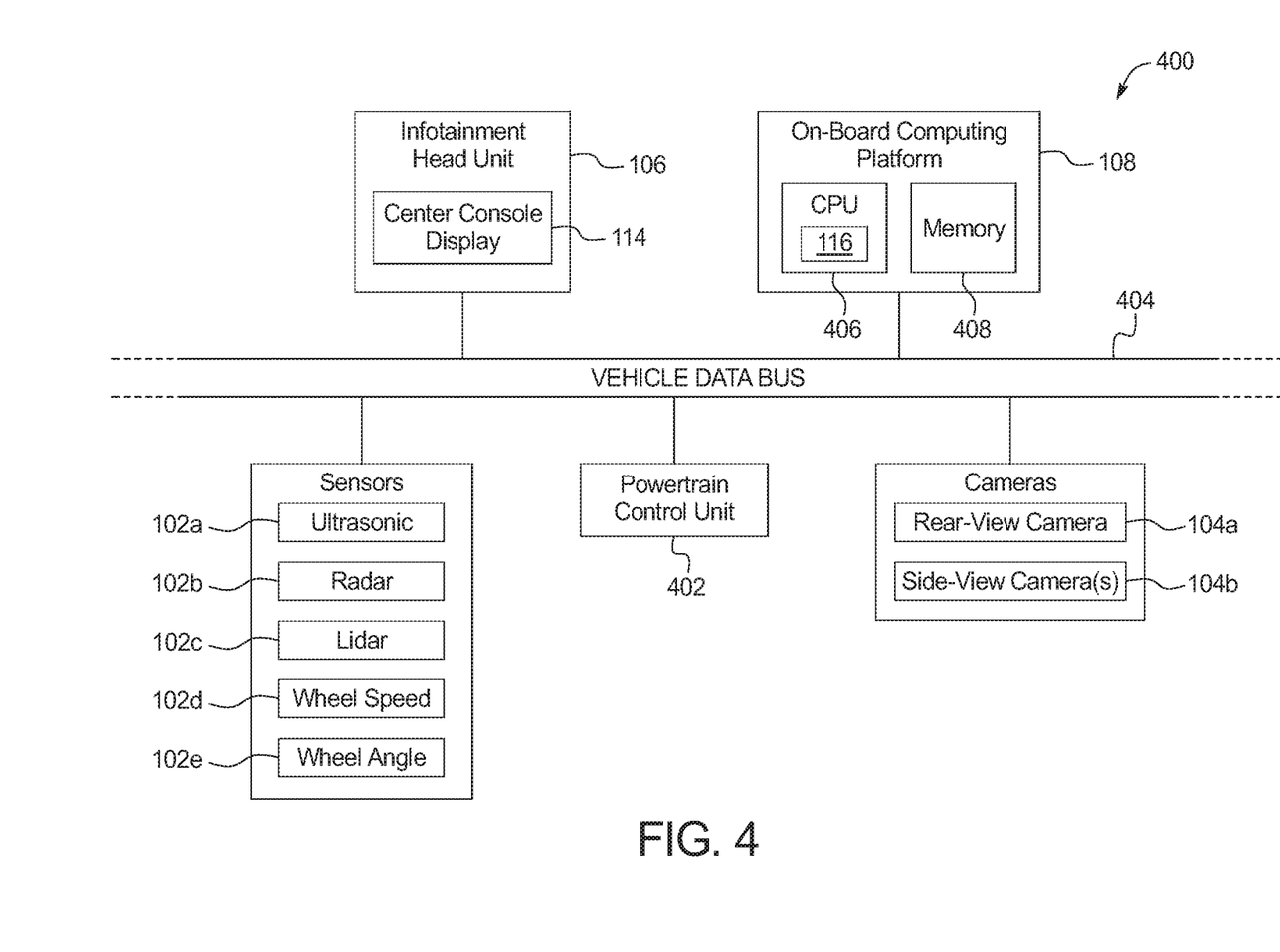
FIG. 4 is a block diagram of electronic components of the vehicle of FIG. 1.

FIG. 4 is a block diagram of electronic components 400 of the vehicle 100 of FIG. 1. In the illustrated example, the electronic components 400 include the sensors 102a-102e, the cameras 104a and 104b, the infotainment head unit 106, the on-board computing platform 108, a power train control unit 402, and a vehicle data bus 404.

The on-board computing platform 108 includes a processor or controller 406 and memory 408. In the illustrated example, the on-board computing platform 108 is structured to include data fuser 116. The processor or controller 406 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 408 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 408 includes multiple kinds of memory, particularly volatile memory and non-volatile memory.

The memory 408 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 408, the computer readable medium, and/or within the processor 406 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The power train control unit 402 includes hardware and firmware to control the ignition, fuel injection, emission systems, transmission and/or the brake system of the vehicle 100. The power train control unit 402 monitors sensors (such as fuel injection sensors, wheel speed sensors, exhaust sensors, etc.) and uses control algorithms to control, for example, fuel mixture, ignition timing, variable cam timing, emissions control, a fuel pump, an engine cooling fan and/or a charging system.

In the illustrated example, the vehicle data bus 404 communicatively couples the sensors 102a-102e, the cameras 104a and 104b, the infotainment head unit 106, the on-board computing platform 108, and a power train control unit 402. In some examples, the vehicle data bus 404 includes one or more data buses. The vehicle data bus 404 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 5:
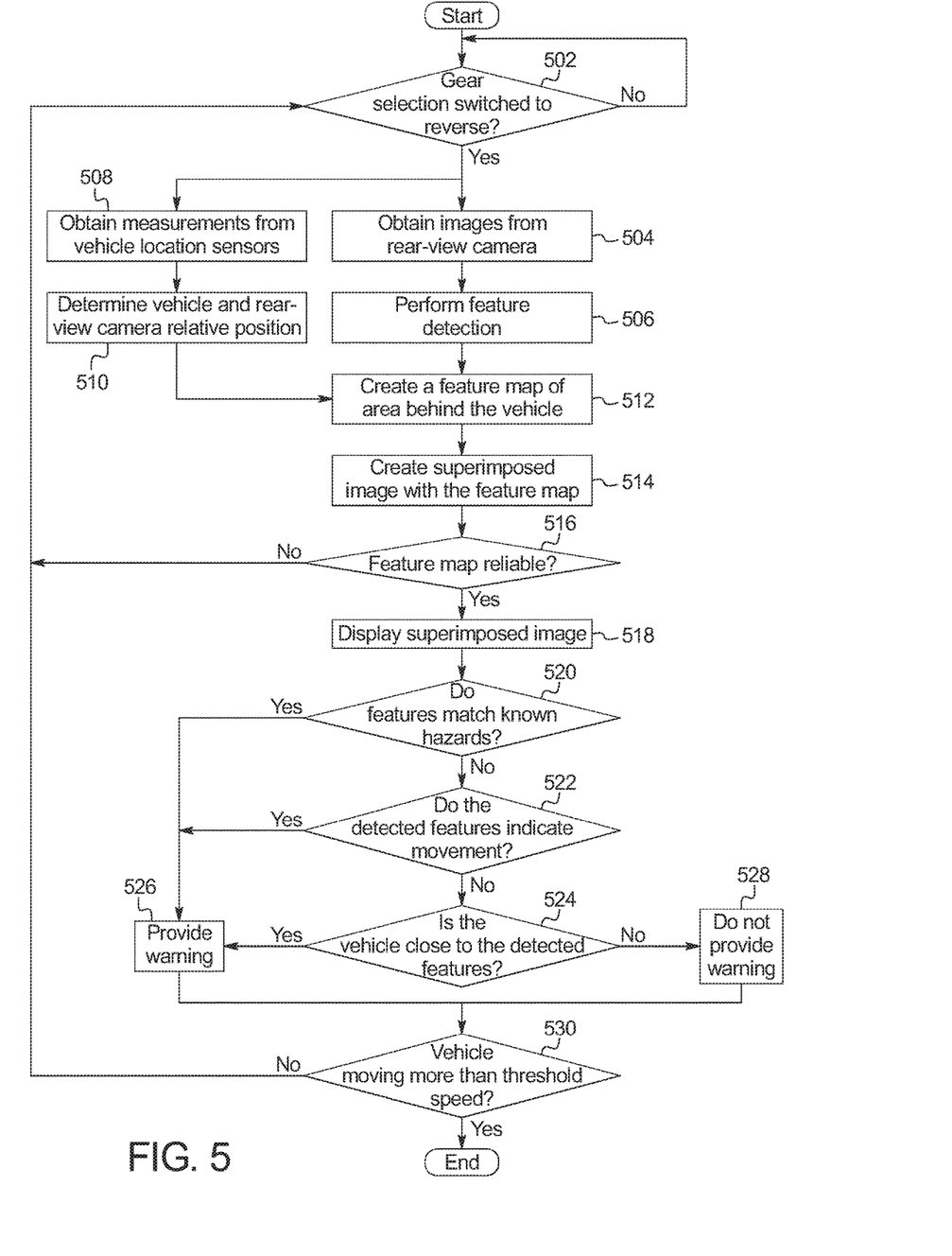
FIGS. 5 and 6 are flowcharts of methods to map obstacles behind the vehicle of FIG. 1 while the vehicle is backing up, which may be implemented by the electronic components of FIG. 4.

FIG. 5 is a flowchart of a method to map obstacles behind the vehicle 100 of FIG. 1 while the vehicle 100 is backing up, which may be implemented by the electronic components 400 of FIG. 4. Initially, at block 502, the data fuser 116 waits until the gear selection is switched into reverse. At block 504, the data fuser 116 obtains images from the rear-view camera 104a. At block 506, the data fuser 116 performs feature detection on the images to identify and/or classify the objected in the images. In some examples, the data fuser 116 also estimates the distance between the vehicle 100 and the detected object(s). At block 508, the data fuser 116 obtains measurements from the vehicle location sensors 102d-102e. At block 510, the data fuser 116 determines the position of the vehicle 100 and the position of the FOV of the rear-view camera 104a relative to the three-dimensional space around the vehicle 100. At block 512, the data fuser 116 creates a point cloud of the three-dimensional area behind the vehicle 100 based on the images from the rear-view camera 104a. At block 514, the data fuser 116 create a superimposed image with the images from the rear-view camera 104a and the point cloud of the three-dimensional area behind the vehicle 100. In some examples, the superimposed image is describes in connection with FIGS. 2 and 3 above.

At block 516, the data fuser 116 determines whether the point cloud is reliable. The point cloud is reliable when a threshold number of images have been analyzed and/or when the rear-view camera 104a is not obstructed. When the point cloud is reliable, the method continues at block 518, otherwise, the method returns to block 502. At block 518, the data fuser 116 displays, via the center console display 114 of the infotainment head unit 106, the superimposed image. At block 520, the data fuser 116 determines whether any of the detected objects match any know hazards (e.g., the pedestrian 112, animals, bicycles, etc.). If any of the detected objects match a known hazard, the method continues at block 526. Otherwise, when none of the detected objects match any known hazard, the method continues at block 522.

At block 522, the data fuser 116 determines whether changes in the point cloud between subsequent analysis of images from the rear-view camera 104a indicate that one or more objects are in motion. In some examples, When one or more objects are in motion, the method continues at block 526. Otherwise, when none of the objects are in motion, the method continues at block 524. At block 524, the data fuser 116 determines whether the vehicle 100 is within a threshold distance (e.g., 6 inches, 1 foot, etc.) of an object based on the point cloud and the location of the vehicle 100 determine using the measurements from the wheel speed sensors 102d and the wheel angle sensors 102e. When vehicle 100 is within the threshold distance of an object, the method continues at block 526. Otherwise, when the vehicle 100 is not within the threshold distance of an object, the method continues at block 528.

At block 526, the data fuser 116 provides an alert to the driver via the infotainment head unit 106. In some examples, the warning is an audiovisual warning (e.g., a sounds, a textual warning, etc.). In some example, the warning is different color coding for portions of the representation 212 of the cross-section of the point cloud (e.g., yellow for portions that indicate motion, red for hazards and/or closed objects, etc.) or outlines 306 that represent the boundaries of the objects. In some examples, the data fuser 116 estimates the speed and trajectory of the moving object and displays an indicator (e.g., a message, a arrow showing the projected trajectory, etc.) when the estimated speed and trajectory places the object behind the vehicle 100. At block 528, the data fuser 116 does not provide a warning. At block 530, the data fuser 116 determines whether the vehicle is moving forward at a speed greater than a threshold speed (e.g., 5 miles per hour, 10 miles per hour, etc.). When the vehicle 100 is traveling at a speed greater than the speed threshold, the method ends. Otherwise, then the vehicle 100 is not traveling at a speed greater than the speed threshold, the method returns to block 502.

Figure 6:
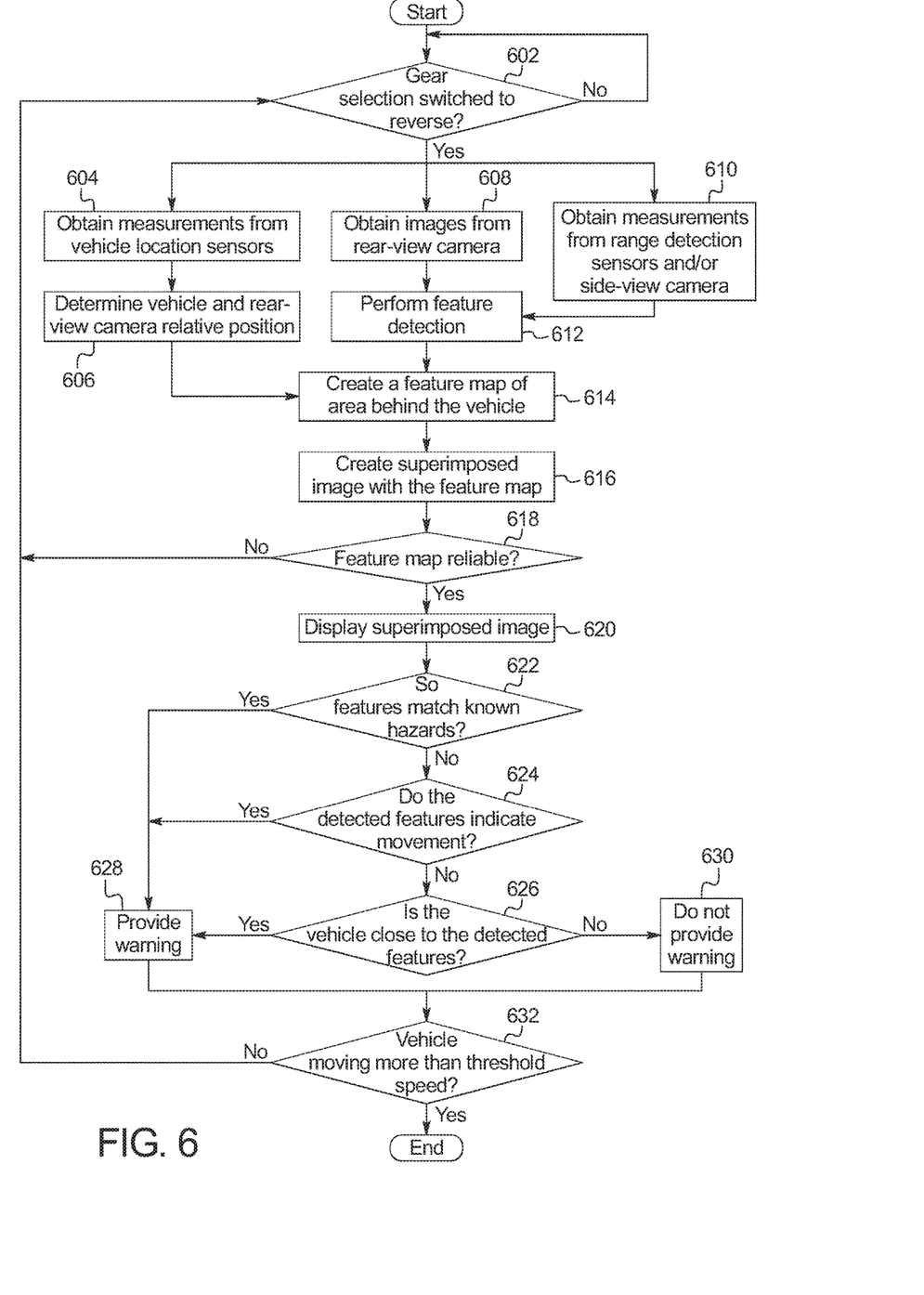

FIG. 6 is a flowchart of a method to map obstacles behind the vehicle 100 of FIG. 1 while the vehicle 100 is backing up, which may be implemented by the electronic components 400 of FIG. 4. Initially, at block 602, the data fuser 116 waits until the gear selection is switched into reverse. At block 604, the data fuser 116 obtains measurements from the vehicle location sensors 102d-102e. At block 606, the data fuser 116 determines the position of the vehicle 100 and the position of the FOV of the rear-view camera 104a relative to the three-dimensional space around the vehicle 100. At block 608, the data fuser 116 obtains images from the rear-view camera 104a. At block 610, the data fuser 116 performs feature detection on the images to identify and/or classify the objected in the images. In some examples, the data fuser 116 also estimates the distance between the vehicle 100 and the detected object(s). At block 612, the data fuser 116 obtains images from the side-mirror cameras 104b and/or measurements from the range detection sensors 102a-102c. At block 614, the data fuser 116 creates a point cloud of the three-dimensional area behind the vehicle 100 based on the images from the rear-view camera 104a. At block 616, the data fuser 116 create a superimposed image with the images from the rear-view camera 104a and the point cloud of the three-dimensional area behind the vehicle 100. In some examples, the superimposed image is describes in connection with FIGS. 2 and 3 above.

At block 618, the data fuser 116 determines whether the point cloud is reliable. The point cloud is reliable when a threshold number of images have been analyzed and/or when the rear-view camera 104a, the side-mirror cameras 104b, and/or the range detection sensors 102a-102c are not obstructed. When the point cloud is reliable, the method continues at block 518, otherwise, the method returns to block 602. At block 620, the data fuser 116 displays, via the center console display 114 of the infotainment head unit 106, the superimposed image. At block 622, the data fuser 116 determines whether any of the detected objects match any know hazards (e.g., the pedestrian 112, animals, bicycles, etc.). If any of the detected objects match a known hazard, the method continues at block 628. Otherwise, when none of the detected objects match any known hazard, the method continues at block 624.

At block 624, the data fuser 116 determines whether changes in the point cloud between subsequent analysis of images from the cameras 104*a* and 104*b* and/or measurements from the range detection sensors 102*a*-102*c* indicate that one or more objects are in motion. When one or more objects are in motion, the method continues at block 628. Otherwise, when none of the objects are in motion, the method continues at block 626. At block 626, the data fuser 116 determines whether the vehicle 100 is within a threshold distance (e.g., 6 inches, 1 foot, etc.) of an object based on the point cloud and the location of the vehicle 100 determine using the measurements from the wheel speed sensors 102*d* and the wheel angle sensors 102*e*. When vehicle 100 is within the threshold distance of an object, the method continues at block 628. Otherwise, when the vehicle 100 is not within the threshold distance of an object, the method continues at block 630.

At block 628, the data fuser 116 provides an alert to the driver via the infotainment head unit 106. In some examples, the warning is an audiovisual warning (e.g., a sounds, a textual warning, etc.). In some example, the warning is different color coding for portions of the representation 212 of the cross-section of the point cloud (e.g., yellow for portions that indicate motion, red for hazards and/or closed objects, etc.) or outlines 306 that represent the boundaries of the objects. At block 630, the data fuser 116 does not provide a warning. At block 632, the data fuser 116 determines whether the vehicle is moving forward at a speed greater than a threshold speed (e.g., 5 miles per hour, 10 miles per hour, etc.). When the vehicle 100 is traveling at a speed greater than the speed threshold, the method ends. Otherwise, then the vehicle 100 is not traveling at a speed greater than the speed threshold, the method returns to block 602.

The flowcharts of FIGS. 5 and 6 are representative of machine readable instructions stored in memory (such as the memory 408 of FIG. 4) that comprise one or more programs that, when executed by a processor (such as the processor 406 of FIG. 4), cause the vehicle 100 to implement the example data fuser 116 of FIGS. 1 and 4. Further, although the example program(s) is/are described with reference to the flowcharts illustrated in FIGS. 5 and 6, many other methods of implementing the example data fuser 116 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a display;
vehicle position sensors;
a rear-view camera; and
a processor to:
generate a three-dimensional model of space behind the vehicle based on images from the rear-view camera;
track a location of the vehicle and the field of view of the rear-view camera in relation to the three-dimensional model of the space behind the vehicle based on measurements from the vehicle position sensors;
generate an overlay based on the three-dimensional model, the overlay including representation of objects not in a present field of view of the rear-view camera; and
display, on the display, the images from the rear-view camera and the overlay.

2. The vehicle of claim 1, including a range detection sensor, and wherein the processor is to generate the three-dimensional model of the space behind the vehicle based on the images from the rear-view camera and measurements from the range detection sensor.

3. The vehicle of claim 2, including side-view mirror cameras, and wherein the processor is to generate the three-dimensional model of the space behind the vehicle based on the images from the rear-view camera, the measurements from the range detection sensor, and images from the side-view mirror cameras.

4. The vehicle of claim 1, wherein the overlay includes a cross-section of the model indicating edges of objects within the model.

5. The vehicle of claim 1, wherein the processor is to classify objects detected by the rear-view camera.

6. The vehicle of claim 5, wherein the overlay includes:
boxes around the objects extending into a portion of the overlay with representations of the objects not in the field of view of the rear-view camera; and
labels associated with the boxes identifying the corresponding objects.

7. The vehicle of claim 1, wherein the processor is to provide an alert via an infotainment system when one of the objects is identified as a hazard.

8. The vehicle of claim 1, wherein the processor is to provide an alert via an infotainment system when the vehicle comes within a threshold distance to an edge of one of the objects according to the model.

9. The vehicle of claim 1, wherein the overlay includes a first indicia demarcating surfaces that are not in the field of view of the rear-view camera, and a second indicia demarcating surfaces that are in motion.

10. A method to assist a reverse moving vehicle, the method comprising:
generating, with a processor, a three-dimensional model of space behind the vehicle based on images from a rear-view camera;
generating an overlay based on the three-dimensional model, the overlay including a cross-section of the model representing edges of surfaces within the model;
displaying, on a center console display, the images from the rear-view camera and the overlay; and
providing an alert via an infotainment system when (i) one of the surfaces in the model is identified as belonging to a hazard or (ii) when the vehicle comes within a threshold distance to one of the surfaces according to the model.

11. The method of claim 10, wherein generating the three-dimensional model of the space is also based on measurements from range detection sensors; and wherein the three-dimensional model of the space also includes areas to the side of the vehicle observable from the range detection sensors.

12. The method of claim 11, wherein generating the three-dimensional model of the space is also based on the images from side-view mirror cameras, and wherein the three-dimensional model of the space also includes the areas to the side of the vehicle observable from the side-view mirror cameras.

13. The method of claim 10, including tracking a location of the vehicle and a field of view of the rear-view camera in relation to the three-dimensional model of the space behind the vehicle based on measurements from vehicle position sensors.

14. The method of claim 10, wherein the overlay includes a first indicia demarcating the surfaces that are not in a field of view of the rear-view camera, and a second indicia demarcating the surfaces that are in motion.

* * * * *